March 11, 1952     H. A. QUIST     2,588,875
CALIBRATED LIQUID LEVEL GAUGE
Filed Nov. 16, 1946
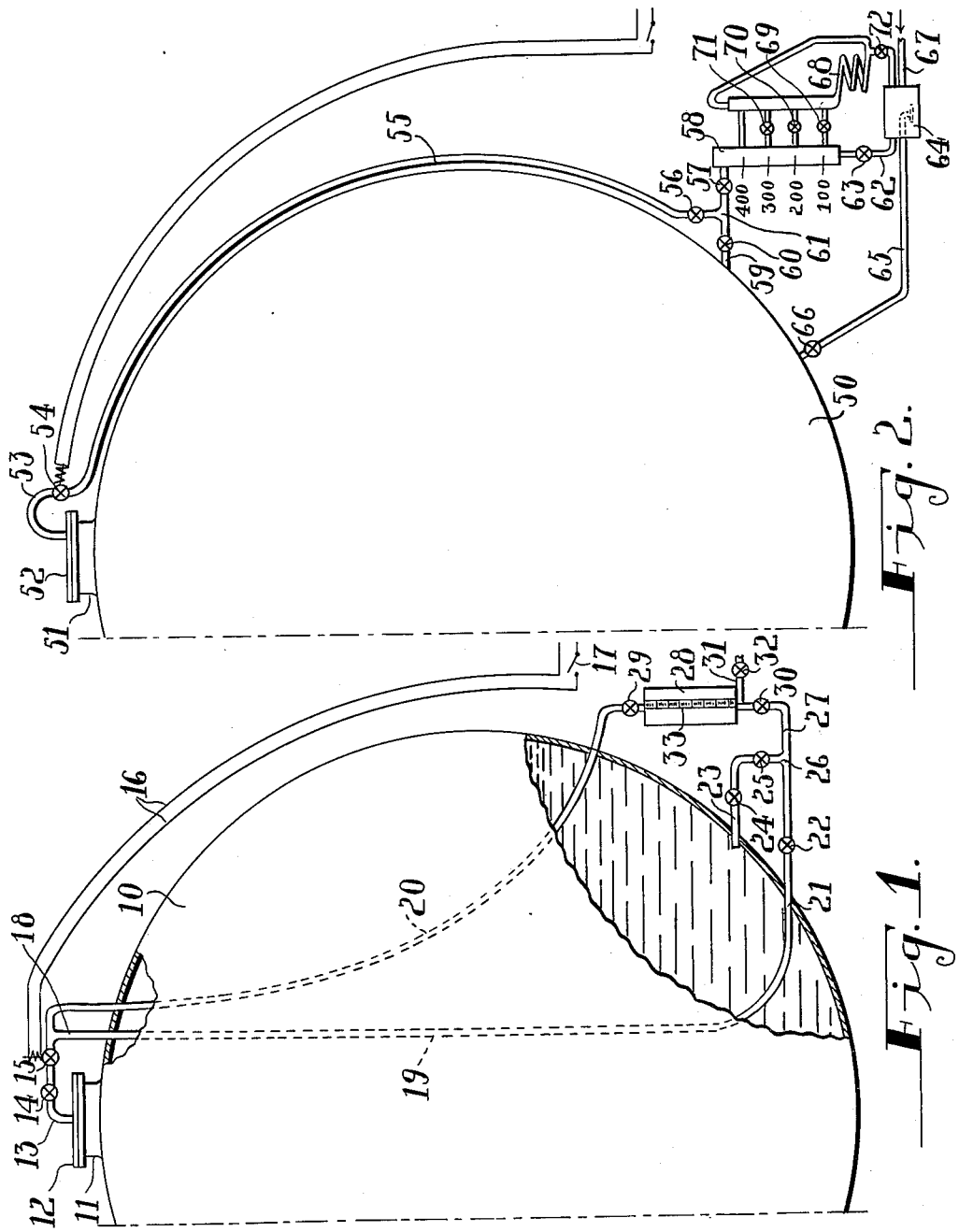
INVENTOR.
Harold A. Quist
BY
Busser and Harding
ATTORNEYS Patented Mar. 11, 1952

2,588,875

UNITED STATES PATENT OFFICE 2,588,875

CALIBRATED LIQUID LEVEL GAUGE

Harold A. Quist, Elkton, Md., assignor to Sun Oil Company, Philadelphia, Pa., a corporation of New Jersey Application November 16, 1946, Serial No. 710,279

2 Claims. (Cl. 73—290)

The present invention relates to apparatus for indicating and gauging the liquid level within a storage tank.

It is a principal object of this invention to provide an improved apparatus for indicating and accurately gauging at a remote and if desired ground level location the amount or level of liquid contained in a relatively large liquid storage tank.

The liquid storage tanks such as are commonly seen at oil refineries are of various sizes and shapes and are customarily provided with some means of indicating the level of liquids contained therein. In the past, such liquid level indicating means has usually comprised either a complicated system of floats and levers or a combination of floats and auxiliary air pressure apparatus. These various forms of liquid level indicators have proved troublesome and inaccurate in operation in view of the many chances for failure of the apparatus due to the float becoming liquid logged and sinking, or the float becoming fouled or corroded and sticking to its guiding device. Furthermore, such float apparatus is affected by fluid currents causing inaccurate indications to be obtained. Also, within the tank the air pressure apparatus is another potential source of trouble which requires frequent inspection and maintenance to avoid complications and inaccuracies.

It is an important object of this invention to overcome the above and other disadvantages of the previous liquid level indicating systems for relatively large liquid storage tanks by providing an improved apparatus for liquid level indicating and gauging, the apparatus having no moving parts or floats and capable of accurately and remotely indicating and gauging the contents of a storage tank by a measurement of relative volumes of liquid.

Further objects and advantages of the invention will be apparent by reference to the following specification and drawing in which:

Figure 1 is a fragmentary elevation partly cut away to show a liquid storage tank to which one form of the liquid level indicator of this invention has been applied.

Figure 2 of the drawing is an elevation similar to Figure 1 but showing a modified form of the invention capable of greater accuracy and finer calibration.

Referring to Figure 1 of the drawing, a relatively large liquid storage tank 10 is shown. This tank may be of any shape or size although a tank of the spheroid type is shown for the purpose of illustration. At the top of the tank 10 is a flanged opening 11 closed by a cover plate 12. Fastened to the cover plate 12 in such manner as to communicate with the vapor pressures in the interior at the top of the storage tank 10 is the pipe line 13. A manual shut-off valve 14 and a solenoid operated shut-off valve 15 are provided in the pipe line 13 near the end fastened to the cover plate 12. Electric wiring 16 and a control switch 17 are connected to a voltage source (not shown) for controllably actuating the solenoid valve 15 to cause it to be opened or shut. The pipe line 13 is branched at 18 to provide two pipe legs 19 and 20 extending downward towards the bottom of tank 10. As shown in Figure 1 of the drawing, the pipe legs 19 and 20 are passed through the walls of the tank 10 and extend downward through the tank interior but it should be understood that such construction is optional since for the purposes of invention the pipe legs 19 and 20 might well extend downward about the exterior of the tank walls. At the bottom portion of tank 10 the pipe leg 19 is horizontally extended at 21 through the tank wall. A manual shut-off valve 22 is provided in the pipe section 21. A pipe line 23 is connected to the tank wall near the bottom of the tank 10 and is adapted to communicate with the liquid contents within the tank in the bottom portion. Manual shut-off valves 24 and 25 are inserted in series with the pipe line 23 as shown. Pipe line 23 joins the pipe section 21 of pipe leg 19 at the T-junction 26, and the joint pipe section 27 is bent vertically upward to be connected with the bottom of the calibrated volumetric container 28. Pipe leg 20 connects with the top of the calibrated container 28 and shut-off valves 29 and 30 respectively are provided to operatively control the connection of pipe lines 20 and 27 to the container 28. A drain pipe 31 and drain valve 32 are connected to the bottom of container 28 to drain its contents when desired. It should be pointed out that the calibrated container 28 is provided with a liquid level sight gauge 33 to indicate the volumetric liquid contents of container 28 which may, if desired, be calibrated in terms of liquid level or volume in the storage tank 10 as will be more fully referred to hereinafter.

With the liquid level gauging apparatus described above I am enabled to apply a new method of gauging remotely and if desired at ground level the liquid contents of relatively large refinery storage tanks. The novel method of this invention provides for the steps of trapping or collecting in the vertically extending pipe leg 19 a small column of liquid equal in height to the level of liquid in the storage tank and thereafter measuring in the calibrated container 28 the volume of the liquid previously collected in the pipe leg 19. Thus, with the proper calibrations on the sight gauge 33 of the calibrated volumetric container 28, the liquid contents of the tank 10 will be accurately gauged and indicated. Furthermore, the provision of valve 15 and pipe leg 20 equalizes the vapor pressure within the tank and the calibrated container.

For a more detailed understanding of the operation of my invention shown in Figure 1 of the drawing consider the following illustrative operating procedure. Assume first that the shut-off valves 14, 22, 24 and 29 are open and that the drain valve 32 has been opened to drain the calibrated container 28 of any liquid that might be in it and has then been closed. Switch 17 is then manipulated to cause the solenoid operated shut-off valve 15 to be opened thus equalizing the vapor pressure in the top of the tank 10 and the pipe legs 19 and 20. At this time shut-off valves 25 and 30 are closed. Valve 25 is then opened, permitting the fluid within tank 10 to pass through open valves 22 and 24 and rise in the pipe leg 19 to a height equal to the height of liquid in the storage tank. There now exists gas of pressure equal to that in the tank in both pipe legs 19 and 20 together with a column of liquid in leg 19 equal in depth to the liquid body in the tank. These contents of the pipe legs 19 and 20 are separated by closed valve 30. Valve 30 is then opened slightly to permit the liquid to rise in container 28 until it just can be seen in the sight gauge 33 after which valves 29 and 30 are closed and the liquid in container 28 again is drained by opening drain valve 32. This procedure eliminates any gas pockets that might have been present in the calibrated container 28 and its associated pipe lines. The drain valve 32 is again closed together with solenoid valve 15 and shut-off valve 25, valve 14 remaining open except when cleaning the conduit system. Valves 29 and 30 are now opened wide permitting the column of fluid previously trapped in pipe leg 19 to flow into the calibrated volumetric container 28 against a head of vapor pressure equivalent to the vapor pressure in the storage tank as has been assured by the function of the solenoid valve 15 and the connecting pipe leg 20. The isolated liquid column of leg 19 balances in the closed conduit system formed with leg 20 through the container 28 and indicates the volume of the liquid in the tank. Thus the liquid level in the storage tank 10 is readily measured remotely and at ground level if desired by measuring within a properly calibrated container 28 the relative volume of a column of liquid that was in the pipe leg 19, which liquid column is equal in height to the liquid level to be measured in the storage tank.

Referring now to Figure 2 of the drawing, a modified form of the invention is shown which provides for the same method of measuring the liquid level contents of the storage tank but employs a somewhat different form of calibrated container having a greater degree of accuracy and providing for a vernier calibration. The storage tank 50 is provided with the flanged opening 51 at its top. A cover plate 52 is sealed across the flanged opening 51 and a pipe 53 communicates with the top interior of tank 50 through cover plate 52. A solenoid operated shut-off valve 54 is provided similar to solenoid valve 15 of Figure 1. The pipe line 53 is continued past valve 54 and downward around the exterior of the storage tank 50 as shown at 55 and communicates through manual shut-off valves 56 and 57 with the top of the primary calibrated volumetric container 58. This primary calibrated container may be provided with a number of arbitrary roughly spaced sight gauge openings suitably calibrated as indicated for example by liquid levels or depths equivalent to 100, 200, 300 and 400.

A pipe line 59 communicates with the liquid contents of the storage tank near its bottom and a shut-off valve 60 operatively connects the pipe 59 through the T-junction 61 and valves 56 and 57 with the pipe leg 55 and the top of calibrated container 58. The bottom of the calibrated container 58 is connected through pipe 62 and shut-off drain valve 63 to a collection chamber 64 that enables the liquid within the calibrated container and associated pipes to be forced back into tank 50 through the pipe line 65 and shut-off valve 66 when air pressure is supplied through air pipe 67. To provide a vernier calibrated indicating means for accurately and exactly measuring the liquid contents of the primary calibrated container 58, a closed circuit vernier calibrated coil 68 is connected through valves 69, 70 and 71 respectively to the arbitrary sight gauge openings indicating liquid levels 100, 200 and 300 of the container 58. Drain valve 72 enables the liquid in the vernier calibrated coil 68 to be withdrawn into collection chamber 64 and forced back into tank 50 through pipe line 65 by air pressure as previously disclosed.

For a detailed description of the operation of this modification of the invention consider the following. Assume first that there is no liquid in either the primary calibrated container 58 or the vernier calibrated coil 68. Solenoid valve 54 is opened to balance the vapor pressure in the tank 50 with that in the pipe line or gauging tube 55. Valve 57 is at that time closed and valves 56 and 60 are opened allowing the fluid to be measured in tank 50 to rise in the measuring tube 55 to a height equal to the height of the fluid in the tank and against the vapor pressure in measuring tube 55. Solenoid valve 54 and shut-off valve 60 are then closed and valve 57 is opened with shut-off drain valves 63 and 72 closed so that the trapped liquid column in measuring tube 55 is permitted to flow into the primary calibrated volumetric container 58. At this same time valves 69, 70 and 71 are also closed. Now, assume that the liquid in the primary calibrated container 58 relative to the liquid level in the tank 50 rises to a point between the roughly spaced sight openings calibrated for the 300 and 400 depth marks. Valve 71 would then be opened to permit the fluid in excess of the 300 depth mark to be drawn off into the vernier calibrated coil 68 where it can be exactly measured. Similarly valves 69 and 70 would be operated for lesser depths of fluid between the 100 and 200 and between the 200 and 300 depth marks. Quantities in excess of the greatest depth mark, 400 in this example, will flow freely to the vernier attachment through connecting pipe 73 without operating a valve. After the measurements have been obtained the drain valves 63 and 72 may be opened so that the fluid may be forced back into the tank 50 as previously described, valve 66 remaining closed throughout the gauging operation.

It should be obvious that other forms of calibrated measuring containers than those shown in Figures 1 and 2 may be used without departing from the sprit and scope of the invention which is concerned primarily with the measurement at a remote point of the liquid level within a relatively large storage tank by measuring the relative volume of a trapped small column of liquid equal in height to the liquid level within the tank.

I claim:

1. In combination: a sealed pressure vessel for the storage of volatile liquids having a vapor space above the liquid level; a conduit, the upper end communicating with said vapor space and the lower end communicating with the liquid space; valve means in the upper end of said conduit to transmit the vapor pressure of said storage tank thereto and isolate said pressure condition therein; valve means in the lower end of said conduit to admit liquid from said storage tank thereto and isolate the liquid therein, thereby subjecting the admitted liquid to the already admitted pressure; a primary volumetric liquid measuring container calibrated in large volume units cooperating with the lower end of said conduit; valve means to admit the isolated liquid in said conduit into said primary measuring container; and a secondary volumetric liquid measuring container adapted to be selectively connected to said primary measuring container at the points of large volume unit calibrations and calibrated to measure liquid volume in subdivisions of said large calibrations thereby acting as a vernier.

2. In combination: a sealed pressure vessel for the storage of volatile liquids having a vapor space above the liquid level; a conduit, exterior of said pressure vessel, the upper end communicating with said vapor space and the lower end communicating with the liquid space; valve means in the upper end of said conduit to transmit the vapor pressure of said storage tank thereto and isolate said pressure condition therein; valve means in the lower end of said conduit to admit liquid from said storage tank thereto and isolate the liquid therein, thereby subjecting the admitted liquid to the already admitted pressure; a primary volumetric liquid measuring container calibrated in large volume units, exterior of said pressure vessel and cooperating with the lower end of said conduit; valve means to admit the isolated liquid in said conduit into said primary measuring container; and a secondary volumetric liquid measuring container adapted to be selectively connected to said primary measuring container at the points of large volume unit calibrations and calibrated to measure liquid volume in subdivisions of said large calibrations thereby acting as a vernier.

HAROLD A. QUIST.

REFERENCES CITED

The following references are of record in the file of this patent:

UNITED STATES PATENTS

| Number | Name | Date |
|---|---|---|
| 1,508,969 | Guichard | Sept. 16, 1924 |
| 1,979,705 | Raymond | Nov. 6, 1934 |

FOREIGN PATENTS

| Number | Country | Date |
|---|---|---|
| 7,999 | Great Britain | of 1909 |
| 327,100 | Germany | Oct. 7, 1920 |
| 842,069 | France | Feb. 20, 1939 |